US007474497B2

(12) United States Patent
Jesionowski et al.

(10) Patent No.: US 7,474,497 B2
(45) Date of Patent: Jan. 6, 2009

(54) DEEP SLOT MAGAZINE STORAGE LIBRARY

(75) Inventors: Leonard G. Jesionowski, Tucson, AZ (US); Shawn M. Nave, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 375 days.

(21) Appl. No.: 11/375,176

(22) Filed: Mar. 14, 2006

(65) Prior Publication Data
US 2007/0217061 A1    Sep. 20, 2007

(51) Int. Cl.
*G11B 15/68* (2006.01)
(52) U.S. Cl. .......................................... 360/92
(58) Field of Classification Search ................. 360/92.1
See application file for complete search history.

(56) References Cited

U.S. PATENT DOCUMENTS

| | | | | |
|---|---|---|---|---|
| 5,345,349 | A | | 9/1994 | Pierrat ........................... 360/92 |
| 5,537,268 | A | * | 7/1996 | Felde et al. ................. 360/92.1 |
| 5,659,440 | A | * | 8/1997 | Acosta et al. ............... 360/92.1 |
| 5,781,367 | A | * | 7/1998 | Searle et al. ................ 360/92.1 |
| 5,971,281 | A | | 10/1999 | Frary et al. .................. 235/487 |
| 6,498,771 | B1 | | 12/2002 | Boyce et al. .............. 369/30.34 |
| 6,560,061 | B2 | * | 5/2003 | Helmick et al. ............. 360/92.1 |
| 2001/0044854 | A1 | | 11/2001 | Frary .......................... 709/310 |
| 2002/0006030 | A1 | * | 1/2002 | Evanson et al. ............. 361/724 |
| 2002/0191322 | A1 | | 12/2002 | Jerman ......................... 360/69 |
| 2004/0264042 | A1 | * | 12/2004 | Pollard et al. ................. 360/92 |
| 2005/0133583 | A1 | | 6/2005 | Tada ........................... 235/375 |
| 2005/0169126 | A1 | | 8/2005 | Wakelin et al. .......... 369/30.38 |

* cited by examiner

*Primary Examiner*—Mark Blouin
(74) *Attorney, Agent, or Firm*—Cantor Colburn LLP; Kurt Goudy

(57) ABSTRACT

Disclosed is a deep slot magazine storage library including a library housing defining a magazine cavity and including an active robotic end and a magazine loading and unloading end. Also included is a plurality of deep slot magazines storable by height and width within the magazine cavity, wherein each of the plurality of deep slot magazines is individually removable from the magazine cavity and wherein each of the plurality of deep slot magazines defines a cartridge cavity. Further included is a plurality of vertical magazine supports disposed within the magazine cavity, wherein the plurality of vertical magazine supports allow individual support of each of the plurality of deep slot magazines. Still further included is a plurality of cartridges removably storable by height, width, and depth within a plurality of cartridge slots defined by at least one cartridge support guide disposed within the cartridge cavity.

6 Claims, 5 Drawing Sheets

DEEP SLOT MAGAZINE STORAGE LIBRARY

FIELD OF THE INVENTION

The disclosure relates generally to data storage libraries, and more particularly to data storage libraries capable of storing cartridges by depth within magazines.

BACKGROUND OF THE INVENTION

Data storage cartridge handling systems typically include a plurality of cartridges as well as an automated data storage library. These systems also usually include a robotic selector, such as a picker arm, which is configured to move cartridges from respective storage slots to a given data storage drive within the automated data storage library. While current automated data storage libraries have the capacity to handle several thousand cartridges, higher density storage of these cartridges is desirable. It would also be desirable and convenient to have the ability to access the parts of automated data storage libraries that need maintenance, such as storage slots, without going through space used by library robotics. Having to interrupt library robotics for maintenance purposes (such as removing jammed cartridges) not only slows library performance, but also affects storage system availability.

Additionally, issues sometimes arise when/if a system user wants to remove cartridges from the library for alternate storage, transport, and/or other uses. Many current automated data storage libraries lack the ability to allow for convenient handling of cartridges outside of the automated library system. Thus, there is a need for an automated data storage library that increases storage density for cartridges, allows library maintenance that is non-invasive to system robotics, and offers convenient removal and handling of cartridges outside of the automated library system.

BRIEF DESCRIPTION OF THE INVENTION

Disclosed is a deep slot magazine storage library including a library housing defining a magazine cavity and including an active robotic end and a magazine loading and unloading end, wherein the magazine loading and unloading end includes a hinged door. Also included is a plurality of deep slot magazines storable by height and width within the magazine cavity, wherein each of the plurality of deep slot magazines is individually removable from the magazine cavity, wherein each of the said plurality of deep slot magazines extends from the active robotic end to the loading and unloading end when stored in the magazine cavity, and wherein each of the plurality of deep slot magazines defines a cartridge cavity. Further included is a plurality of vertical magazine supports associated with the library housing and disposed within the magazine cavity, wherein the plurality of vertical magazine supports include a plurality of support guides that are associable with at least one groove defined by each of the plurality of deep slot magazines, allowing individual support of each of the plurality of deep slot magazines. Still further included is a plurality of cartridges removeably storable by height, width, and depth within a plurality of cartridge slots defined by at least one cartridge support guide disposed within the cartridge cavity.

BRIEF DESCRIPTION OF THE FIGURES

The foregoing and other features and advantages of the present invention should be more fully understood from the following detailed description of illustrative embodiments taken in conjunction with the accompanying Figures in which like elements are numbered alike in the several Figures.

DETAILED DESCRIPTION OF THE INVENTION

Figure 1:
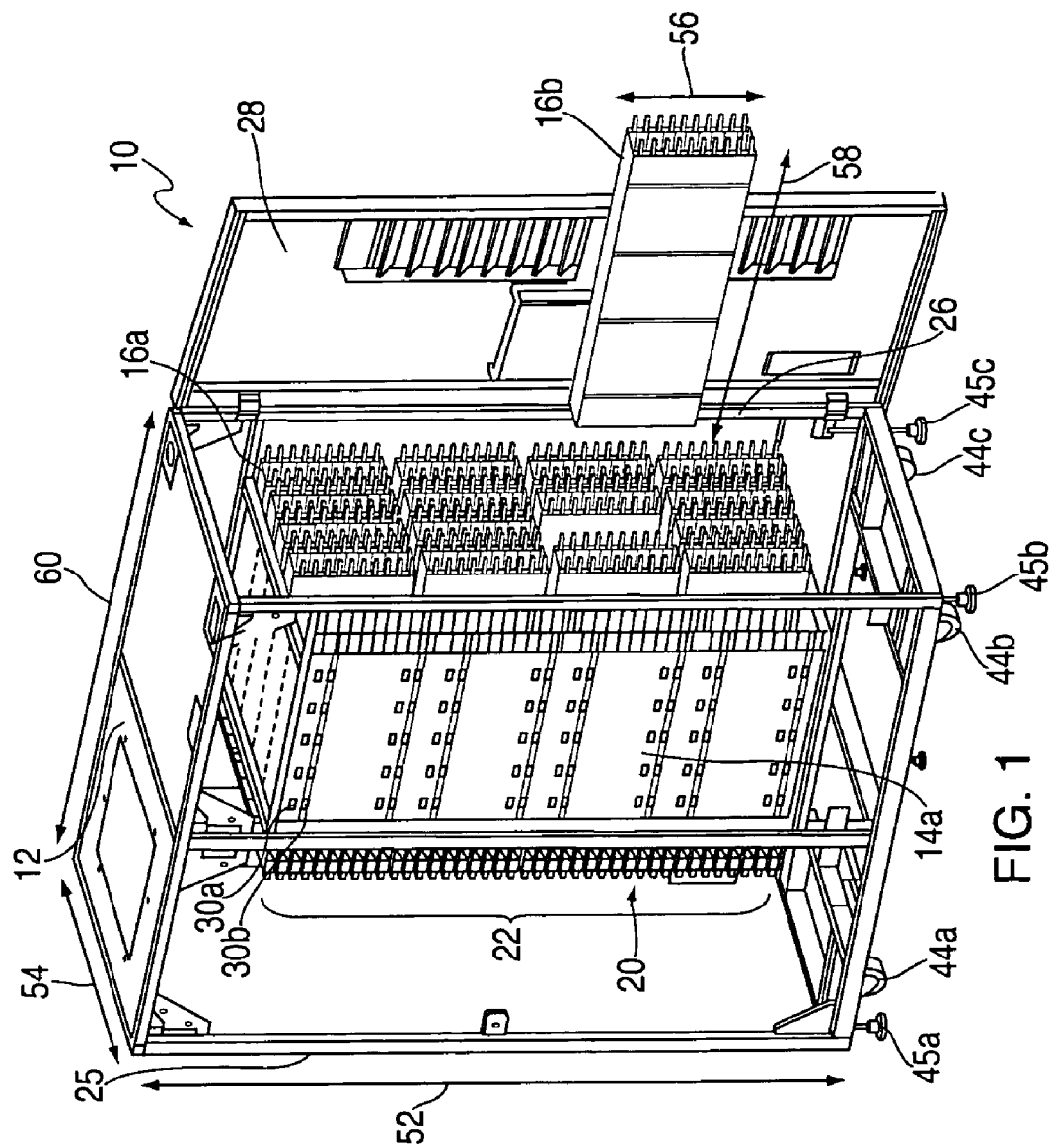
FIG. 1 is a side perspective view of a deep slot magazine storage library.
Figure 2:
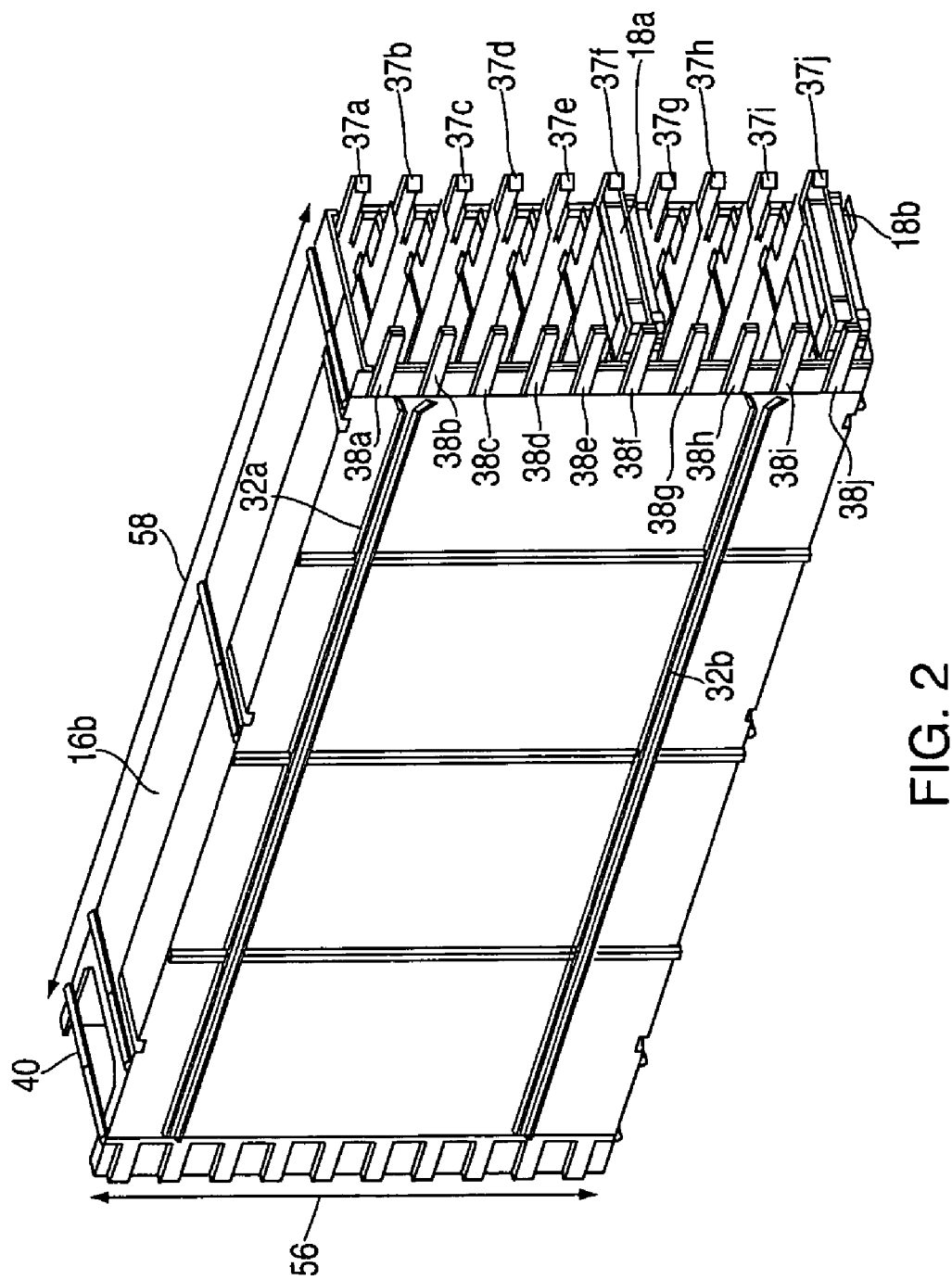
FIG. 2 is a side perspective view of a deep slot magazine.
Figure 3:
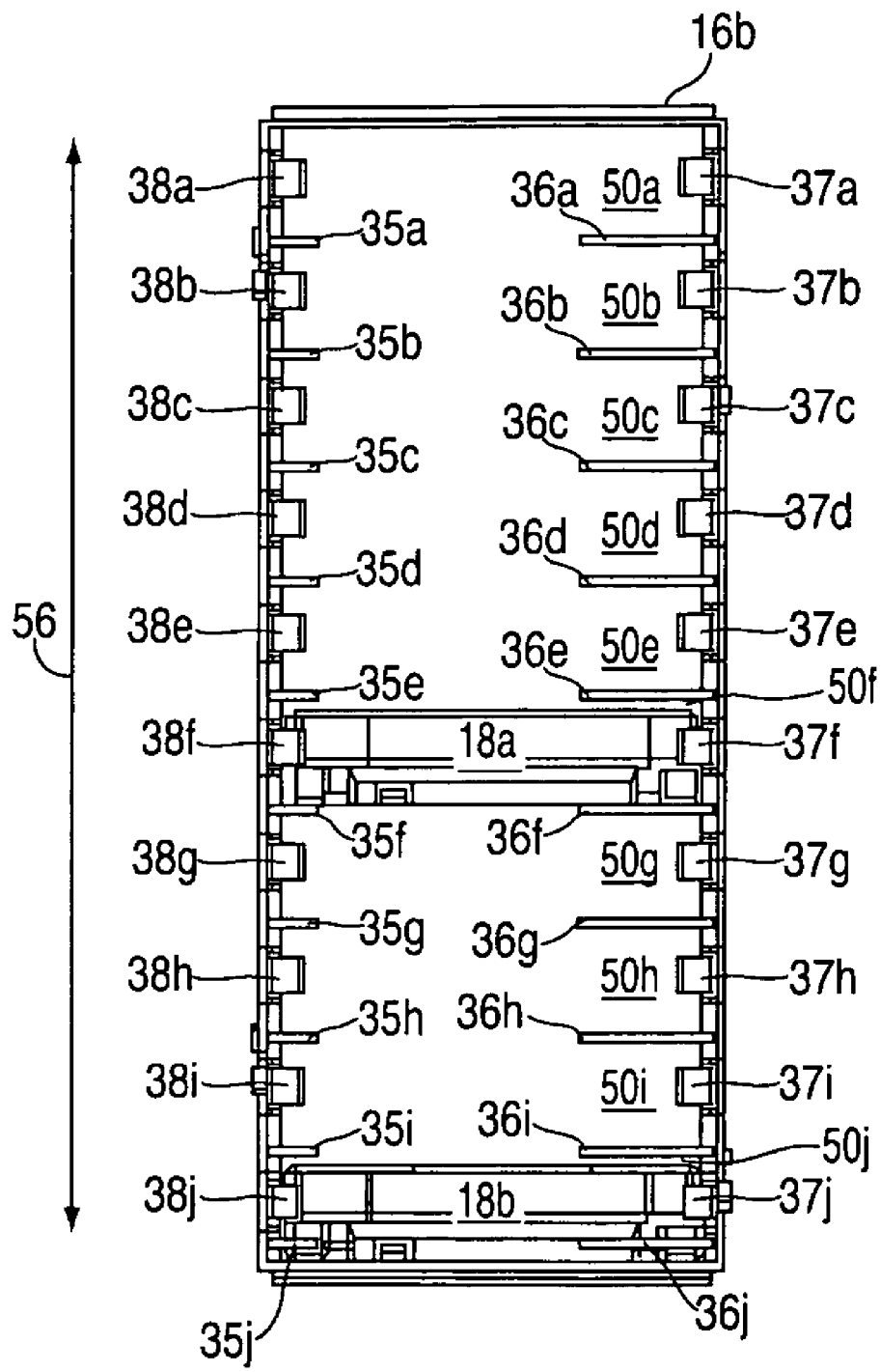
FIG. 3 is a front elevation view of the deep slot magazine.
Figure 4:
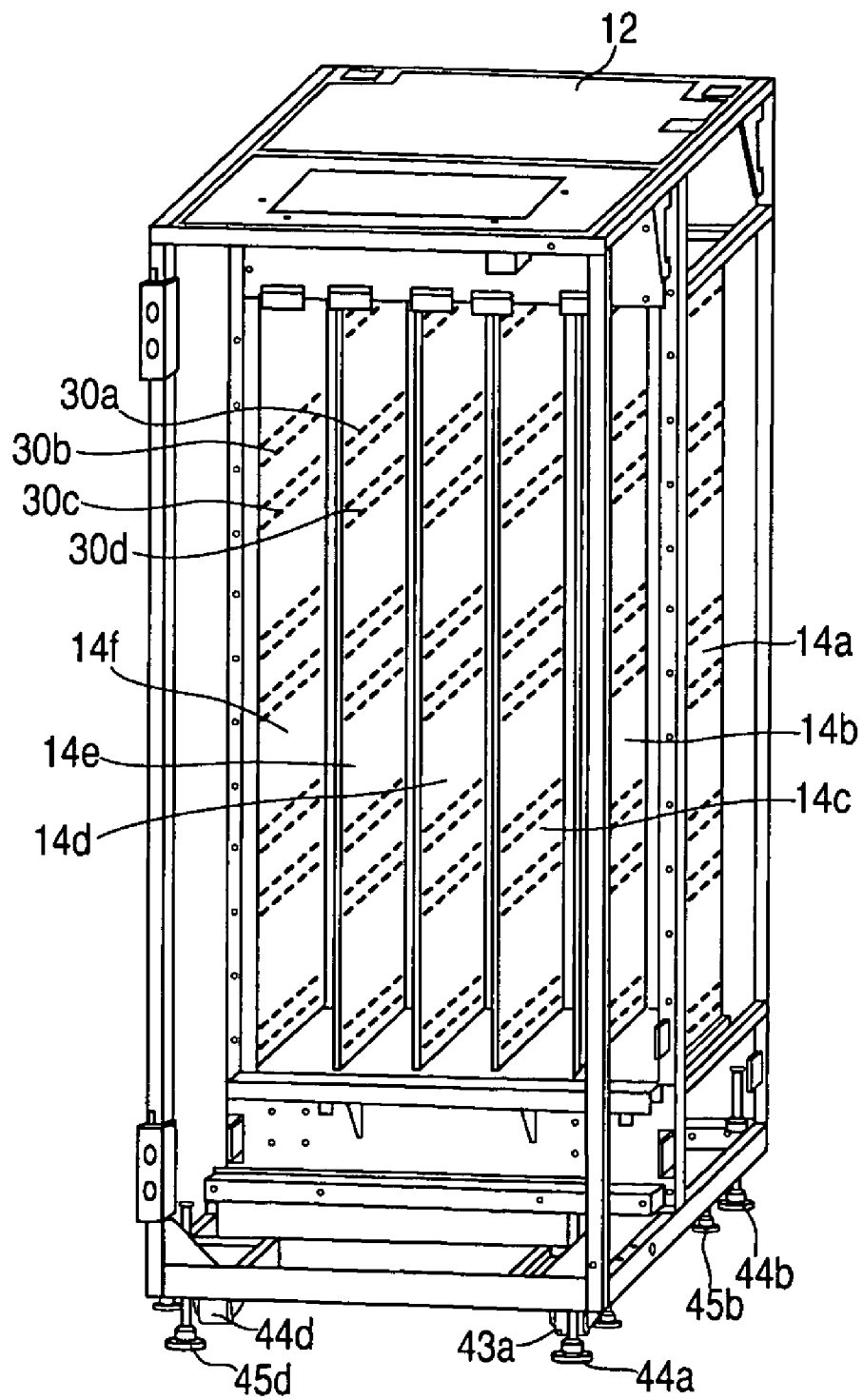
FIG. 4 is a front perspective view of the deep slot magazine storage library.
Figure 5:
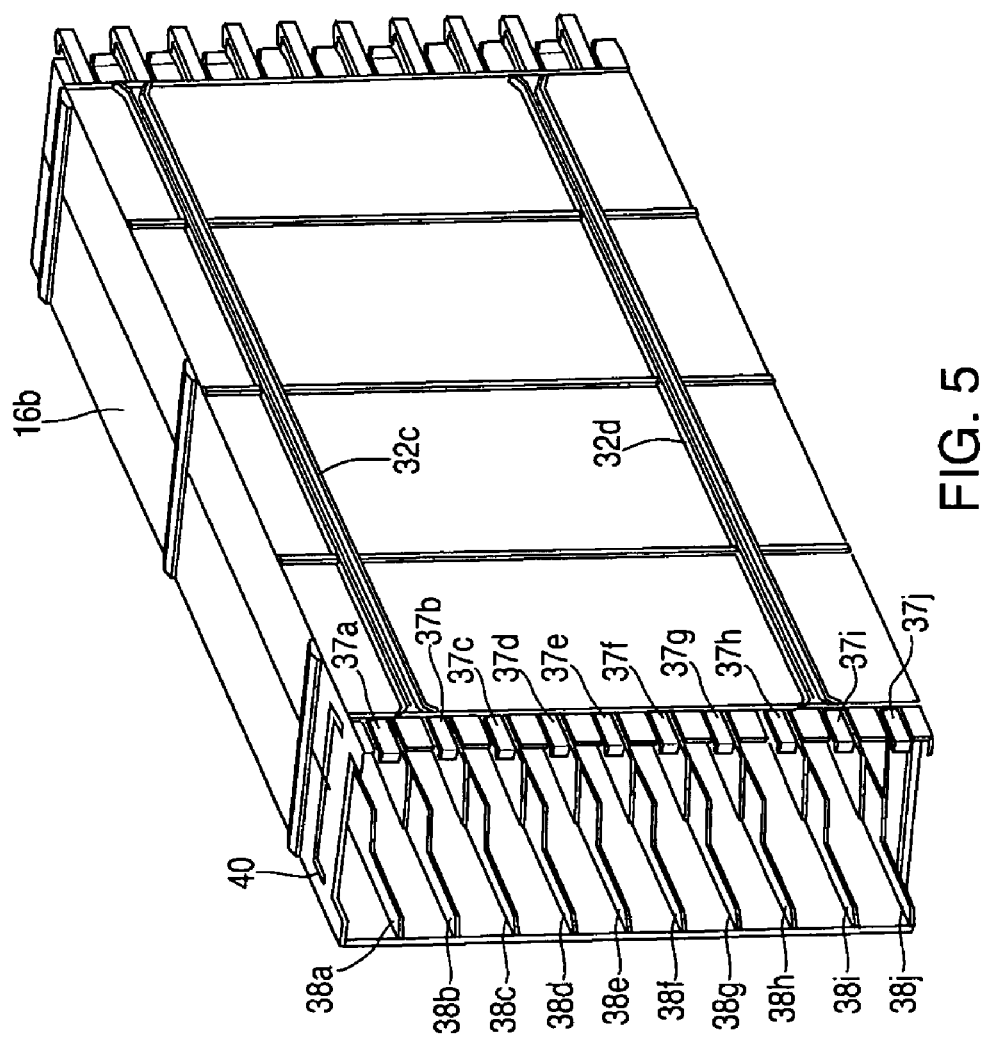
FIG. 5 is a side perspective view of a side of the deep slot magazine opposite a side shown in FIG. 2.

Referring to FIGS. 1-5 simultaneously, a deep slot magazine storage library 10 allowing for storage of magazines that themselves store cartridges in depth is illustrated and includes a library housing 12, a plurality of vertical magazine supports (illustrated as supports 14*a-f*), a plurality of deep slot magazines (designated in the illustration as magazines 16*a-b*, though more (20 total) are illustrated) and a plurality of cartridges (illustrated in FIG. 2 and FIG. 3 as cartridges 18*a-b*). As mentioned above, these deep slot magazines 16*a-b* store the cartridges 18*a-b* in depth. The storage in depth of these cartridges 18*a-b* within the deep slot magazines 16*a-b*, and the manner in which the deep slot magazines themselves may be individually removable and storable within the library housing 12 will be discussed herein below.

In order to best describe the manner in which the deep slot magazines themselves may be individually removable and storable within the library housing 12, non-magazine related components of the deep slot magazine storage library 10 will first be described, beginning with the library housing 12. The library housing 12 defines a magazine cavity 20, and includes an active robotic end 22 and a magazine loading and unloading end 24. The active robotic end 22 and the magazine loading and unloading end 24 are located at opposite sides of the library housing 12, with the active robotic end 22 being located at a relative front side 25 of the library housing 12 and the magazine loading and unloading end 24 being located at a relative back side 26 of the library housing 12. Locating the active robotic end 22 and the magazine loading and unloading end 24 at opposite sides of the library housing 12 allows library contents residing within the magazine cavity 20 (such as the magazines 16*a-b* and supports 14*a-f* introduced above and discussed in greater detail below) to be maintained and/or removed from the loading and unloading end 24 of the library housing 12 without interfering with the active robotic end 22. The library housing 12 also includes a hinged door 28 disposed at the magazine loading and unloading end 24, wherein the hinged door 28 allows access to the magazine loading and unloading end 24. A frontal hinged door (not pictured) may additionally be disposed on the relative front side of the housing 12, allowing access to the active robotic end 22 of the library housing 12.

It should also be appreciated that the non-magazine related components of a preferred embodiment of the deep slot storage library 10, such as the library housing 12 and active robotic end 22, may include some of features found in automated data storage libraries known in the art, such as an IBM 3584 UltraScalable Tape Library and other similar libraries. These libraries, and thus the preferred embodiment of the deep slot storage library 10, may include robotic cartridge selectors (not illustrated), such as a robotic pick arms, which access the active robotic end 22 and are configured to move cartridges 18*a-b* from the magazines 16*a-b* to a selected cartridge drive (not pictured). At least one data storage drive for reading and/or writing data from/to the cartridges 18*a-b* may also be included, wherein the robotic cartridge selectors and data storage drives operate in response to commands from at least one external host system (not shown).

While the non-magazine related components of the preferred embodiment of the deep slot storage library 10 may include some of the features found in known libraries, these components also includes novel features designed to allow storage of the deep slot magazines 16a-b. These features include supports 14a-f, which may snap or slide fit into association with the library housing 12, or be unitarily constructed/formed with the library housing 12. The supports 14a-f include a plurality of support guides, designated in the illustration as guides 30a-d, though more (42 total) are illustrated, which support the magazines 16a-b via at least one groove (illustrated as grooves 32a-d) defined by each of the magazines 16a-b. The guides 30a-d and grooves 32a-d allow the supports 14a-f to individually support the magazines 16a-b while they are stored within the magazine cavity 20. That is, each magazine 16a-b is individually supported by the support guides 14a-f without the need for support from each other, allowing a magazine to remain supported and in place when a magazine directly below it is removed. Thus, any of the magazines 16a-b may be removed without any consequences to the surrounding magazines 16a-b. The supports 14a-f and magazines 16a-b may also include snap features (not illustrated) that lock the magazines 16a-b into place during storage.

When stored, the magazines 16a-b extend from the active robotic end 22 to the magazine loading and unloading end 24. They are removably stored within the magazine cavity 20 by housing height 52 and housing width 54 (i.e. they are stored side by side and on top of each other, but not one behind the other by depth), and may be removed from the library housing 12 for transport via the loading and unloading end 24.

The magazines 16a-b themselves also define a cartridge cavity 34. Disposed within the cartridge cavity 34 is at least one cartridge support guide (illustrated as cartridge guides 35a-j and 36a-j). The cartridge guides 35a-j and 36a-j may snap or slide fit into association with walls of the cartridge cavity 34, or be unitarily constructed/formed with the magazine 16a-b itself. These cartridge guides 35a-j and 36a-j may run along each side of the magazines 16a-b (as shown in FIG. 3) and extend from the front to the back.

The cartridge guides 35a-j and 36 a-j further define a plurality of cartridge slots, illustrated as slots 50a-j. The above mentioned cartridges 18a-b are storable within these slots 50a-j by height, width, and depth within the cartridge cavity 34, though the illustrations show magazines 16a-b capable of storage only by a magazine height 56 and a magazine depth 58. Thus, the cartridges 18a-b, which are also stored by height and width within the magazine cavity 20 due to the side by side stacking of the magazines 16a-b (see FIG. 1), are stored within the magazine cavity 20 by the housing height 52, the housing width 54, and a housing depth 60 relative to the library housing 12. By storing the cartridges 18a-b by the housing height 52, the housing width 54, and the housing depth 60 of the library housing 12, storing density of the cartridges 18a-b is maximized. It should be appreciated that the magazines 16a-b have the ability to store cartridges 18a-b comprising any type of removable storage media, including magnetic tape cartridges and optical disk cartridges.

Besides being stored within the magazines 16a-b and thus library structure 12, the cartridges 18a-b may also be transported along with the magazines 16a-b when the magazines are removed from the library housing 12, or be individually accessed from magazines 16a-b by the robotic cartridge selector via the active robotic end 22. With respect to transporting cartridges 18a-b within removed (from the library housing 12) magazines 16a-b, the magazines 16a-b may include cartridge retaining features (illustrated as retaining structures 37a-j and 38a-j) that keep the cartridges 18a-b in place within the cartridge cavity 34 during magazine 16a-b transport, as well at least one handle (represented in FIG. 2 and FIG. 5 as handle 40) that allow for more convenient magazine 16a-b transport. In addition, cartridges intended for significant transport may include greater spacing between slots 50a-j, and thicker, more rugged walls. All of these magazine 16a-b features, coupled with organized storage of the cartridges 18a-b by magazine the magazine height 56 and the magazine depth 58 (and possibly magazine width), allow for convenient handling and transport of the cartridges outside of the deep slot magazine storage library 10.

With respect to accessing the cartridges with robotic cartridge selector via the active robotic end 22, accessing takes place while the cartridges 18a-b are within the magazines 16a-b and library housing 12, wherein selection is controlled by the external host system mentioned briefly above. The external hosts system directs the robotic cartridge selector to select a specific cartridge to be brought to, and inserted into one of the data storage drives for reading and/or writing data from/to the cartridges. If, for example, a cartridge to be selected for placement in one of the data storage drives is located within the magazine 16a-b behind (by depth and relative to the location of the robotic cartridge selector) a non-selected cartridge(s), the robotic cartridge selector will remove the non-selected cartridge(s) to access the selected cartridge. In order to accomplish this selection, the robotic cartridge selector may place the removed, non-selected cartridge in a temporary storage area, such as an empty cartridge slot 50a-j in any magazine 16a-b, or an intended temporary door slot located on the frontal door (mentioned briefly above). In this manner the robotic cartridge selector may access cartridges at any depth of the magazine 16a-b.

While the invention has been described with reference to an exemplary embodiment, it should be understood by those skilled in the art that various changes may be made and equivalents may be substituted for elements thereof without departing from the scope of the invention. In addition, many modifications may be made to adapt a particular situation or substance to the teachings of the invention without departing from the scope thereof. Therefore, it is important that the invention not be limited to the particular embodiment disclosed as the best mode contemplated for carrying out this invention, but that the invention will include all embodiments falling within the scope of the apportioned claims. Moreover, unless specifically stated any use of the terms first, second, etc. do not denote any order or importance, but rather the terms first, second, etc. are used to distinguish one element from another.

What is claimed is:

1. A deep slot magazine storage library comprising:
a library housing defining a magazine cavity and including an active robotic end and a magazine loading and unloading end located opposite said active robotic end, wherein said magazine loading and unloading end includes a hinged door that is operable to said magazine cavity, said hinged door allowing access to any contents of said magazine cavity via said magazine loading and unloading end;
a plurality of deep slot magazines storable by height and width within said magazine cavity, wherein each of said plurality of deep slot magazines is individually removable from said magazine cavity, wherein each of said plurality of deep slot magazines extends from said active robotic end to said opposite magazine loading and unloading end when stored in said magazine cavity, and wherein each of said plurality of deep slot magazines defines a cartridge cavity;

a plurality of vertical magazine supports associated with said library housing and disposed within said magazine cavity, said plurality of vertical magazine supports including a plurality of support guides which are associable with at least one groove defined by each of said plurality of deep slot magazines, allowing individual support of each of said plurality of deep slot magazines; and a plurality of cartridges removeably storable by depth and at least one of height and width within a plurality of cartridge slots defined by at least one cartridge support guide disposed within said cartridge cavity, wherein each of said plurality of cartridge slots stores at least two of said plurality of cartridges in depth, and wherein said cartridge cavity is open at both of two opposing ends of each of said plurality of said deep slot magazines.

2. A deep slot magazine storage library according to claim 1, wherein said active robotic end is accessed by a robotic cartridge selector.

3. A deep slot magazine storage library according to claim 1, wherein each of said plurality of deep slot magazines include a plurality of cartridge retaining features.

4. A deep slot magazine storage library according to claim 1, wherein each of said plurality of deep slot magazines include at least one handle.

5. A deep slot magazine storage library according to claim 2, further including a temporary cartridge storage area for temporarily storing a non-selected cartridge when accessing a selected cartridge.

6. A deep slot magazine storage library according to claim 5, wherein said selected cartridge is selected by an external host system to be inserted into a data storage drive by said robotic cartridge selector.

* * * * *